(12) United States Patent
Yang et al.

(10) Patent No.: US 12,301,348 B2
(45) Date of Patent: May 13, 2025

(54) OUTER CODE FOR UPPER LAYER DATA UNITS

(71) Applicant: QUALCOMM Incorporated, San Diego, CA (US)

(72) Inventors: Wei Yang, San Diego, CA (US); Aziz Gholmieh, Del Mar, CA (US); Hwan Joon Kwon, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/831,253

(22) Filed: Jun. 2, 2022

(65) Prior Publication Data
US 2022/0393789 A1    Dec. 8, 2022

Related U.S. Application Data

(60) Provisional application No. 63/197,657, filed on Jun. 7, 2021.

(51) Int. Cl.
*H04L 1/00* (2006.01)
*H04L 1/18* (2023.01)
*H04L 1/1829* (2023.01)

(52) U.S. Cl.
CPC .......... *H04L 1/0009* (2013.01); *H04L 1/0061* (2013.01); *H04L 1/1835* (2013.01); *H04L 1/1864* (2013.01)

(58) Field of Classification Search
CPC ... H04L 1/0009; H04L 1/0061; H04L 1/1835; H04L 1/1864
See application file for complete search history.

(56) References Cited

U.S. PATENT DOCUMENTS

| | | | |
|---|---|---|---|
| 2007/0150788 A1* | 6/2007 | Zhuyan | H04L 1/0071 714/749 |
| 2019/0312676 A1* | 10/2019 | Jeong | H03M 13/15 |
| 2020/0044792 A1* | 2/2020 | Vaidya | H04L 47/34 |
| 2023/0396362 A1* | 12/2023 | Shin | H04L 1/0057 |

* cited by examiner

*Primary Examiner* — Derrick V Rose
(74) *Attorney, Agent, or Firm* — Seyfarth Shaw LLP

(57) ABSTRACT

A method of wireless communication, by a transmitting device, includes encoding information packets with an outer code to generate a first outer codeword. The first outer codeword includes information packets in addition to parity packets. The method also includes transmitting, to a receiving device, the information packets and the parity packets of the first outer codeword, according to a sequence. A method of wireless communication by a receiving device, includes receiving packets belonging to a first outer codeword, the packets including information packets and parity packets. The method also includes storing the packets in a buffer; and flushing the packets from the buffer in response to satisfying a condition.

28 Claims, 10 Drawing Sheets

OUTER CODE FOR UPPER LAYER DATA UNITS

CROSS-REFERENCE TO RELATED APPLICATION

The present application claims the benefit of U.S. Provisional Patent Application No. 63/197,657, filed on Jun. 7, 2021, and titled "OUTER CODE FOR UPPER LAYER DATA UNITS," the disclosure of which is expressly incorporated by reference in its entirety.

FIELD OF THE DISCLOSURE

The present disclosure relates generally to wireless communications, and more specifically to applying outer codes for encoding upper layer data units, such as transport blocks (TBs) and protocol data units (PDUs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method of wireless communication, by a transmitting device, includes encoding information packets with an outer code to generate a first outer codeword. The first outer codeword includes information packets in addition to parity packets. The method also includes transmitting, to a receiving device, the information packets and the parity packets of the first outer codeword, according to a sequence.

According to further aspects of the present disclosure, a method of wireless communication by a receiving device includes receiving packets belonging to a first outer codeword, the packets including information packets and parity packets. The method also includes storing the packets in a buffer, and flushing the packets from the buffer in response to satisfying a condition.

According to aspects of the present disclosure, an apparatus for wireless communication, by a transmitting device, comprises a memory, and at least one processor coupled to the memory. The at least one processor is configured to encode information packets with an outer code to generate a first outer codeword. The first outer codeword including the information packets in addition to parity packets. The at least one processor is also configured to transmit, to a receiving device, the information packets and the parity packets of the first outer codeword, according to a sequence.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
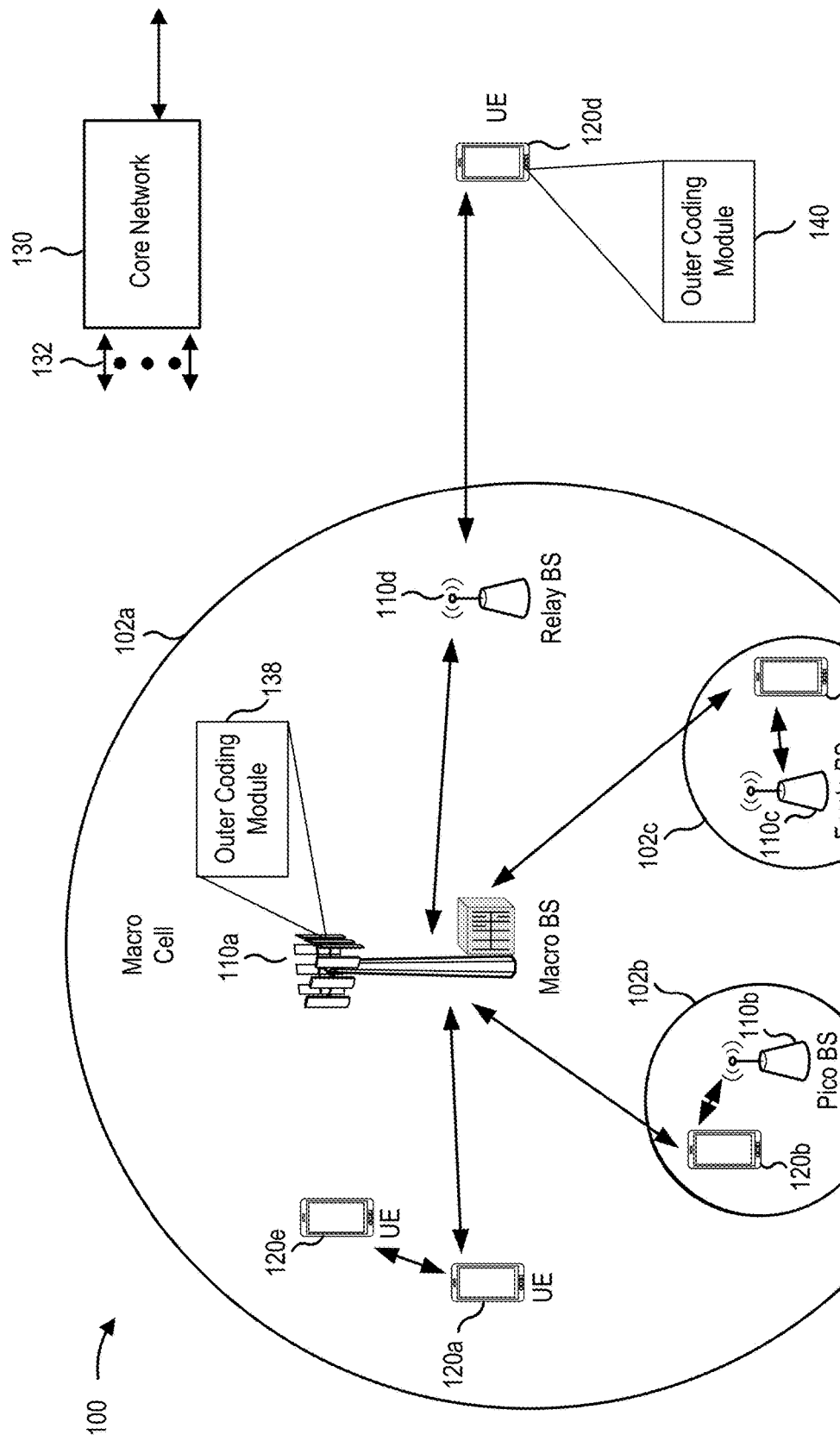
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communication may be unreliable in some instances. To address the unreliability, channel coding may be employed. Channel coding adds redundancy bits in a transmitted message to improve decoding accuracy. In case there are errors in parts of the message, the decoder may recover the information by relying on the redundant information.

As communication techniques evolve, higher throughput is expected. For example, in 3GPP Release 18 and beyond of 5G new radio (NR) enhanced mobile broadband (eMBB) specifications, a higher throughput is envisioned. However, higher throughput implies a higher memory buffer requirement at both the transmitter and the receiver. According to aspects of the present disclosure, channel coding techniques including outer codes are employed to reduce the buffer requirement to support high throughput use cases.

In current technologies, a hybrid automatic repeat request (HARQ) buffer and a layer 2 (L2) buffer define the memory footprint in a user equipment (UE) modem design. For a frequency range one (FR1) system with a 20 Gbps throughput, a total buffer size of 190 MB is expected. Furthermore, both the HARQ buffer and L2 buffer scale linearly with the peak throughput supported by the UE. For example, doubling the throughput for enhanced mobile broadband (eMBB) communications implies twice the buffer size to be implemented in the UE. For a 40 Gbps throughput, a buffer of almost 400 MB is expected for FR1 systems. These larger buffer sizes may be costly for future UE devices.

According to aspects of the present disclosure, outer codes may be employed to reduce the HARQ and L2 buffer size specified to support high throughput use cases. In some aspects, four times more throughput may be supported without increasing the total buffer size.

According to aspects of present disclosure, a channel code, referred to as an outer code, is applied to data units at higher layers to achieve forward error correction. For example, an encoder applies the outer code to transport blocks at a medium access control (MAC) layer or protocol data units (PDUs) at the radio link control/packet data convergence protocol (RLC/PDCP) layer (e.g., L2). Applying the outer codes ensures in-order delivery of packets at the PDCP layer with high reliability and low latency, which in turn reduces the required memory to sustain a given throughput. The outer codes are sent in a codeword, enabling decoding of earlier packets that may have been incorrectly decoded. That is, the outer codes enable recovery of the failed packets. Outer codes refer to channel codes at a higher layer, as opposed to inner codes that are applied to bits at the physical layer. By including the outer codes, the HARQ buffer may be reduced or even eliminated.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an outer coding module 140. For brevity, only one UE 120d is shown as including the outer coding module 140. The outer coding module 140 may encode information packets with an outer code to generate a first outer codeword. The first outer codeword includes information packets in addition to parity packets. The outer coding module 140 may also transmit, to a receiving device, the information packets and the parity packets of the first outer codeword, according to a sequence.

The base stations 110 may include an outer coding module 138 for receiving packets belonging to a first outer codeword, the packets including information packets and parity packets. The outer coding module 138 may also store the packets in a buffer, and flush the packets from the buffer in response to satisfying a condition.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
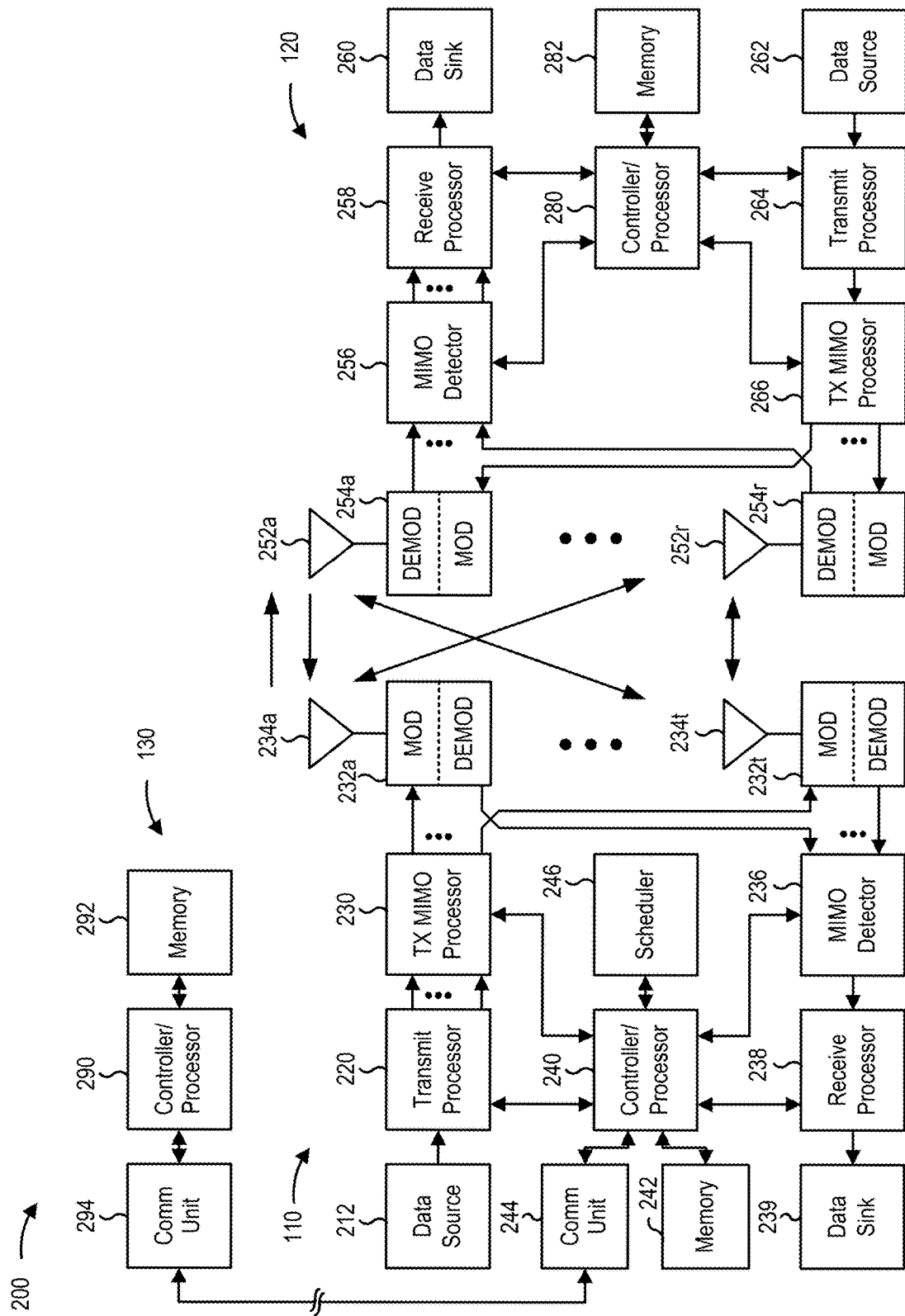
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with outer coding for upper layers as described in more detail elsewhere. For example, the controller/processor 240 of the base station 110, the controller/processor 280 of the UE 120, and/or any other component(s) of FIG. 2 may perform or direct operations of, for example, the processes of FIGS. 8 and 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for encoding, means for transmitting, means for indicating, means for configuring, means for determining, means for skipping, means for receiving, means for requesting, means for selecting, means for storing, means for flushing, means for starting, and means for performing. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
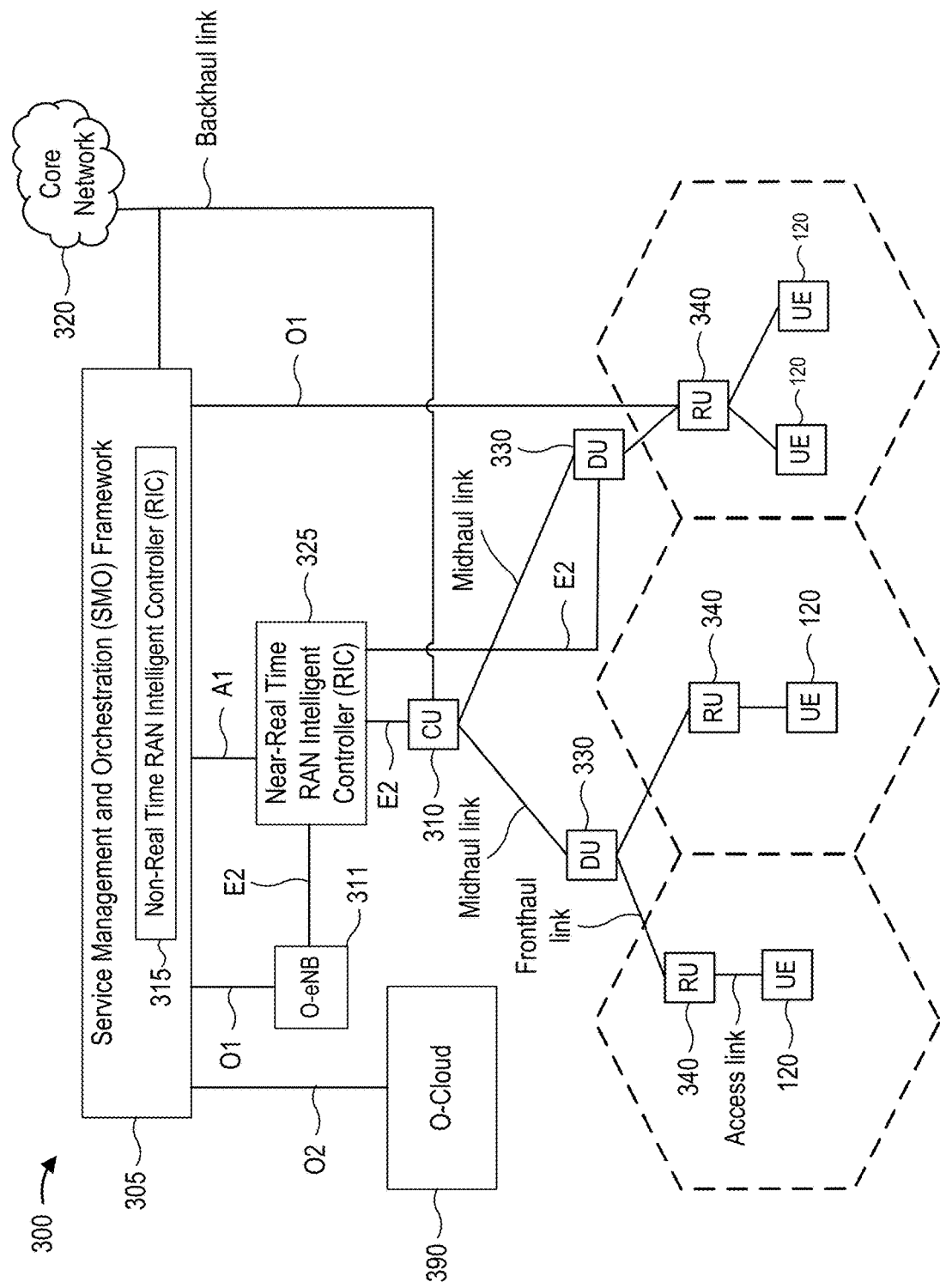
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via 01) or via creation of RAN management policies (such as A1 policies).

Wireless communication may be unreliable in some instances. To address the unreliability, channel coding may be employed. Channel coding adds redundancy bits in a transmitted message to improve decoding accuracy. In case there are errors in parts of the message, the decoder may recover the information by relying on the redundant information.

As communication techniques evolve, higher throughput is expected. For example, in 3GPP Release 18 and beyond of 5G new radio (NR) enhanced mobile broadband (eMBB) specifications, a higher throughput is envisioned. However, higher throughput implies a higher memory buffer requirement at both the transmitter and the receiver. According to aspects of the present disclosure, channel coding techniques including outer codes are employed to reduce the buffer requirement to support high throughput use cases.

In current technologies, a hybrid automatic repeat request (HARQ) buffer and a layer 2 (L2) buffer define the memory footprint in a UE modem design. The HARQ buffer stores soft log-likelihood ratio (LLR) bits corresponding to failed transport blocks (TBs) waiting for HARQ retransmission. The stored bits are combined with retransmitted bits to improve the chances of successful decoding. The HARQ buffer size is determined by a transmission time interval (TTI) length, a number of configured HARQ processes, and a peak throughput supported by the UE.

The L2 buffer stores correctly received out-of-order packets in the radio link control/packet data convergence protocol (RLC/PDCP) layer. The packets stored are later packets that are correctly received prior to correctly receiving packets earlier in the sequence. The L2 buffer size is determined by RLC round trip latency and the peak throughput supported by the UE.

For a frequency range one (FR1) system with a 20 Gbps throughput, a total buffer size of 190 MB is expected. For example, a 90 MB HARQ buffer and a 100 MB L2 buffer are specified. For a frequency range two (FR2) system with a 20 Gbps throughput, a total buffer size of over 70 MB is expected. Furthermore, both the HARQ buffer and L2 buffer scale linearly with the peak throughput supported by the UE. For example, doubling the throughput for enhanced mobile broadband (eMBB) communications implies twice the buffer size to be implemented in the UE. For a 40 Gbps throughput, a buffer of almost 400 MB is expected for FR1 systems. These larger buffer sizes may be costly for future UE devices.

According to aspects of the present disclosure, outer codes may be employed to reduce the HARQ and L2 buffer size specified to support high throughput use cases. In some aspects, four times more throughput may be supported without increasing the total buffer size.

Figure 4:
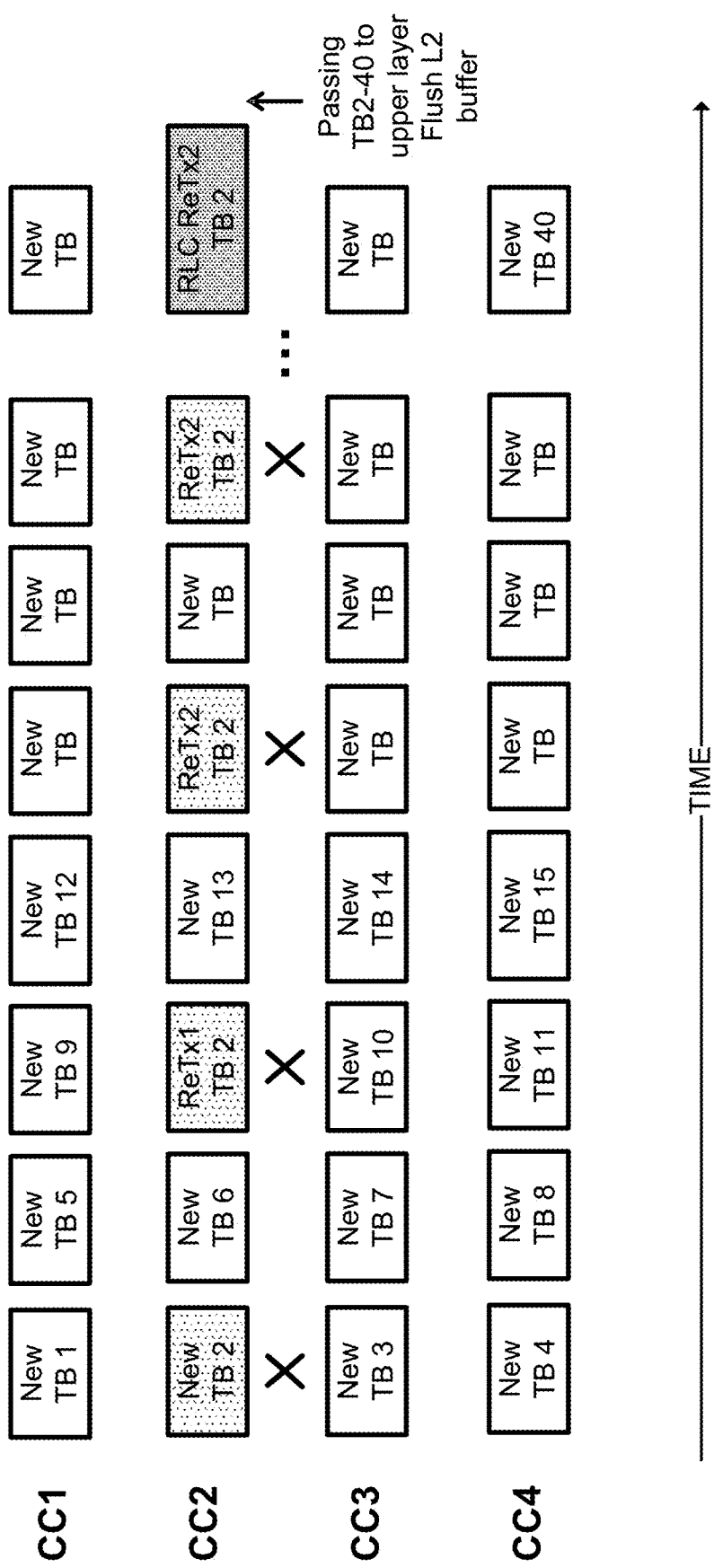
FIG. 4 is a block diagram illustrating reception of transport blocks (TBs) across four component carriers (CCs).

FIG. 4 is a block diagram illustrating reception of transport blocks (TBs) across four component carriers (CCs) (e.g., CC1, CC2, CC3, and CC4). As seen in FIG. 4, at a first time, a first new transport block (TB 1) is correctly received on a first component carrier (CC1). A second new transport block (TB 2) is not correctly received on a second component carrier (CC2). A third new transport block (TB 3) is correctly received on a third component carrier (CC3), and a fourth new transport block (TB 4) is correctly received on a fourth component carrier (CC4). Because the second new transport block (TB 2) is not correctly received, the third and fourth TBs (TB 3 and TB 4) are out of sequence and thus stored in the L2 buffer.

In the next time period, the fifth, sixth, seventh, and eighth transport blocks (TB 5-TB 8) are correctly received and also stored in the L2 buffer. In the subsequent time periods, the ninth new TB (TB 9) is correctly received and stored in the L2 buffer. A first retransmission (ReTx1) of the second transport block (TB 2) is unsuccessfully received over the second component carrier (CC2). The tenth through fifteenth new transport blocks (TB 10-TB 15) are successfully received and stored in the L2 buffer. A second and third retransmission (ReTx2 and ReTx3) of the second transport block (TB 2) again fail and as a result, additional new TBs are stored in the L2 buffer.

Finally, at a later time period, a radio link control (RLC) retransmission of the second transport block (RLC ReTx TB 2) is successful. During this later time period, additional transport blocks, up to and including a fortieth new transport block (TB 40) are successfully received. At this time, the L2 buffer may be flushed after passing the second through fortieth transport blocks to an upper layer for further processing. As can be seen, all TBs after TB 2 need to be buffered in the L2 buffer due to out-of-order receipt before TB 2 is correctly received through the RLC retransmission (RLCReTx).

According to aspects of present disclosure, a channel code, referred to as an outer code, is applied to data units at higher layers to achieve forward error correction. For example, an encoder applies the outer code to transport blocks at a medium access control (MAC) layer (TBs at the MAC layer are also referred to as MAC layer PDUs) or protocol data units (PDUs) at the RLC/PDCP layer (e.g., L2). Applying the outer codes ensures in-order delivery of packets at the PDCP layer with high reliability and low latency, which in turn reduces the required amount of memory to sustain a given throughput.

The outer codes are sent in a codeword, enabling recovery of earlier packets that may have been incorrectly decoded at the lower layer (e.g., at the physical layer). That is, the outer codes enable recovery of the failed packets. Outer codes refer to channel codes at a higher layer, as opposed to inner codes that are applied to bits at the physical layer. By including the outer codes, the HARQ buffer may be reduced or even eliminated. In some aspects of the present disclosure, the L2 buffer size is determined based on a length of the outer code, a maximum or peak throughput that the UE can support, a transmit time interval (TTI) length, a maximum transport block size per component carrier, and/or a maximum number of component carriers supported by the UE.

In the present disclosure, the term "packet" denotes the unit to which the outer code is applied. A packet may refer to a TB if the outer code is applied at the MAC layer, or an RLC/PDCP PDU if the outer code is applied at L2. Alternatively, a new communication layer may be added either between the RLC layer and PDCP layer, or between the MAC and RLC layers, in order to support the application of outer codes. For example, an outer-coding layer may be added between the RLC and PDCP layers, which takes packets from the PDCP layer, adds redundancy through outer coding, and then passes to the RLC layer. In this way, outer codes may be supported in the existing communication system without changing the behavior of existing layers.

Outer coding may be performed across different packets. The original packets generated from the upper layers are referred to as systematic/information packets, and the packets generated from systematic/information packets through outer coding are referred to as parity packets or redundant packets. Therefore, a "packet" is analogous to a "bit" in case the code is applied on the physical layer. An outer codeword includes the information packets and parity packets that are involved in the same encoding function.

Figure 5:
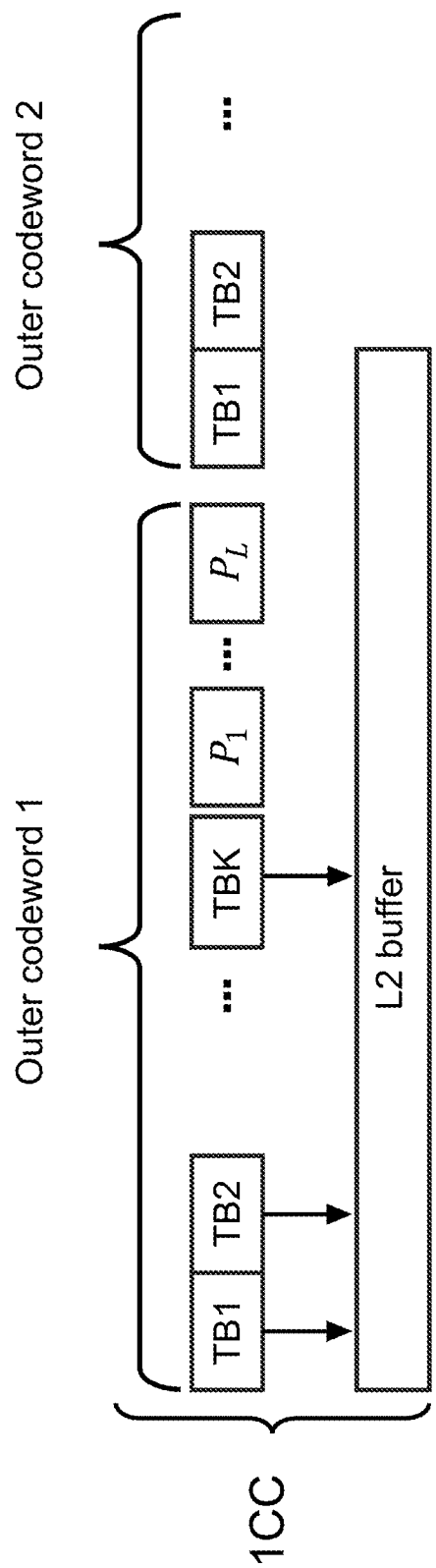
FIG. 5 is a block diagram illustrating application of outer codes, in accordance with aspects of the present disclosure.

FIG. 5 is a block diagram illustrating application of outer codes, in accordance with aspects of the present disclosure. In FIG. 5, a first outer codeword (outer codeword 1) and a second outer codeword (outer codeword 2) are transmitted across a single component carrier (1CC). The first outer codeword includes K packets (TB 1 . . . TB K). It is noted that FIG. 5 shows TBs or transport blocks, which are an example of a type of packet, as described previously. This disclosure, however, is not so limiting. The first outer code word also includes L parity bits ($P_1$ . . . $P_L$). Similarly, the second outer codeword includes K transport blocks (TB 1, TB 2 . . . ) and L parity bits (not shown).

In the event that one of the transport blocks (e.g., TB2) is incorrectly received, the parity bits may help recover the failed packet. For example, if the first parity packet $P_1$ corresponds to TB 1+TB 2 and information packet one (TB1) is correctly received but information packet two (TB 2) is not correctly received, the decoder may determine the value of the second information packet (TB 2) by subtracting the first information packet (TB 1) from the first parity packet.

In aspects of the present disclosure, from a transmitter perspective, the transmitter may encode the information packets (e.g., TB 1 . . . TB K) using the outer codes to generate an outer codeword including the information packets (e.g., TB 1 . . . TB K) and parity packets (($P_1$ . . . $P_L$). The transmitter may then send the information packets and parity packets sequentially to a receiver. In some aspects, the sequence includes information packets, followed by parity packets. The sequence may be configured by a base station.

In some aspects, the packets may be indexed. In the example of FIG. 5, the information packets are indexed 1 to K and the parity packets are indexed 1 to L. An overall index from 1 to m (not shown) may also be included. Additionally, the transmitter may assign each outer codeword a codeword index. In the example of FIG. 5, the codeword indexes are 1 and 2. The transmitter may transmit the codewords according to the ordering defined by the codeword index. That is, the transmitter transmits all packets belonging to a first outer codeword, which includes both information packets and parity packets, before it begins transmitting any packet that belongs to another or new outer codeword (e.g., outer codeword 2).

In other aspects of the present disclosure, when an outer code is configured or enabled at the MAC layer or L2, the receiver stores all correctly received packets in the L2 buffer for an outer codeword, until a condition is fulfilled. All correctly received packets of the codeword are saved in case one of these packets is needed to help recover a failed packet.

A first example of satisfying a condition occurs when all information packets belonging to the outer codeword are correctly received by the receiver after decoding. The receiver may then deliver all correctly received information packets to the upper layers in the order of the packet indices as soon as the packets have been decoded and are determined to be in order. The receiver may flush the L2 buffer when this condition is satisfied. Flushing the L2 buffer refers to flushing all packets associated with the first codeword from the L2 buffer. However, the packets associated with another codeword (e.g., a codeword with a higher codeword index) may not be flushed.

A second example of satisfying a condition occurs when the receiver receives a packet that belongs to a different outer codeword, which means that the transmission of the previous outer codeword is completed by the transmitter. In some configurations, the first outer codeword has a lower index than the next, different codeword. In some aspects, a base station may configure a discard timer at a UE, where the timer triggers after the UE receives a packet that belongs to the next outer codeword. Thus, the buffer is not flushed immediately. The timer allows for additional time for the transmitter to retransmit a packet or the UE to decode the packets. In some aspects of the present disclosure, each outer codeword has an associated discard timer. When the timer expires, the UE delivers all out-of-order received information packets to the upper layers, and flushes all packets that belong to the previous outer codeword. By configuring the timer for a short period, the buffer size may be further reduced. In some aspects, a base station configures a UE with parameters for the timer, such as a timer duration. For example, the duration may be based on scheduling decisions of the base station, such as whether the base station enables layer one (L1) automatic repeat request (ARQ) processing.

Figure 6A:
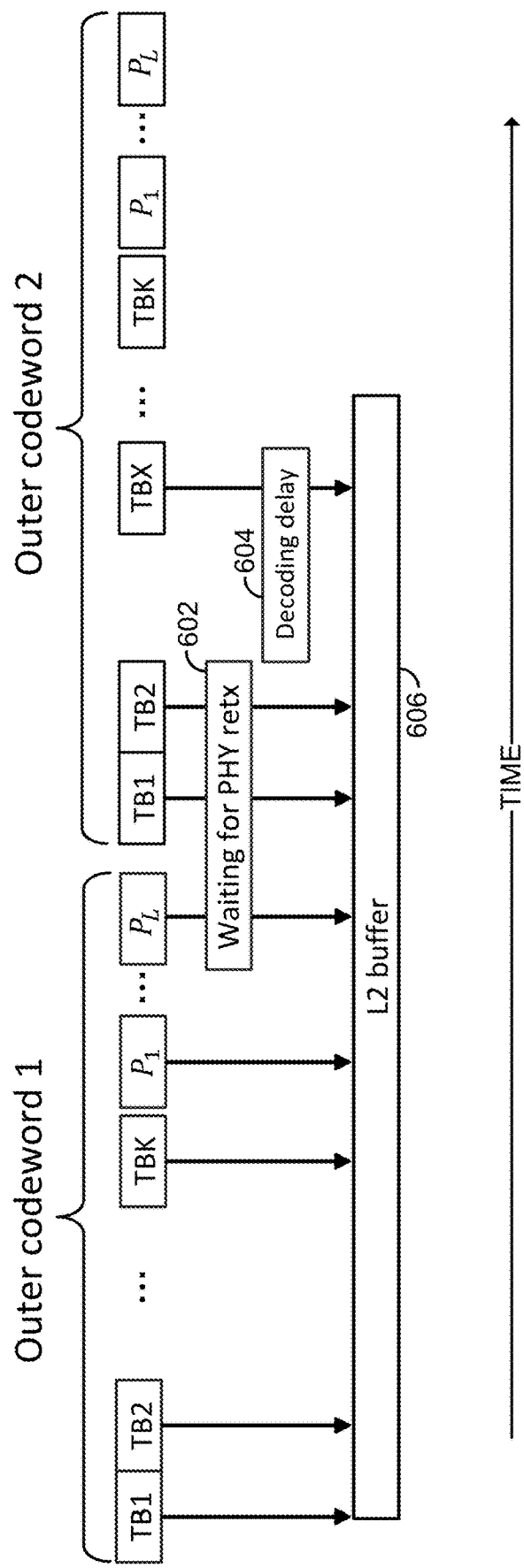
FIG. 6A is a block diagram illustrating an overall system view for layer two (L2) buffer processing, in accordance with aspects of the present disclosure.

FIG. 6A is a block diagram illustrating an overall system view for layer two (L2) buffer processing, in accordance with aspects of the present disclosure. As seen in FIG. 6A, a first outer codeword (outer codeword 1) and a second outer codeword (outer codeword 2) are prepared for transmission. Each of the outer codewords includes K information packets (TB 1 to TB K) and L parity packets ($P_1$ to $P_L$). The transmitter transmits the packets in sequence and the codewords in sequence. Once the upper layer transmits parity packet $P_L$, the first outer codeword is complete, from the upper layer's perspective. The upper layer may immediately switch to transmitting the next codeword (outer codeword 2).

From the receiver perspective, there is some latency associated with receiving the packets. Moreover, if a packet (e.g., the parity packet $P_L$) fails at the lower layer, the lower layer may attempt to retransmit the packet (e.g., parity packet $P_L$) to correct for the failure. Thus, additional time elapses while waiting for the physical layer retransmission(s), as seen at block 602. Moreover, the receiver takes some time to decode the packets after they are received, resulting in a decoding delay, as seen at block 604. As a result of the delays, an L2 buffer 606 stores not only the packets belonging to the first codeword (outer codeword 1), but also some of the packets belonging to the next codeword (outer codeword 2). In the example of FIG. 6A, the information packets TB 1 to TB X belonging to the second outer codeword (outer codeword 2) are stored in the L2 buffer 606, along with all of the packets belonging to the first outer codeword (outer codeword 1).

Figure 6B:
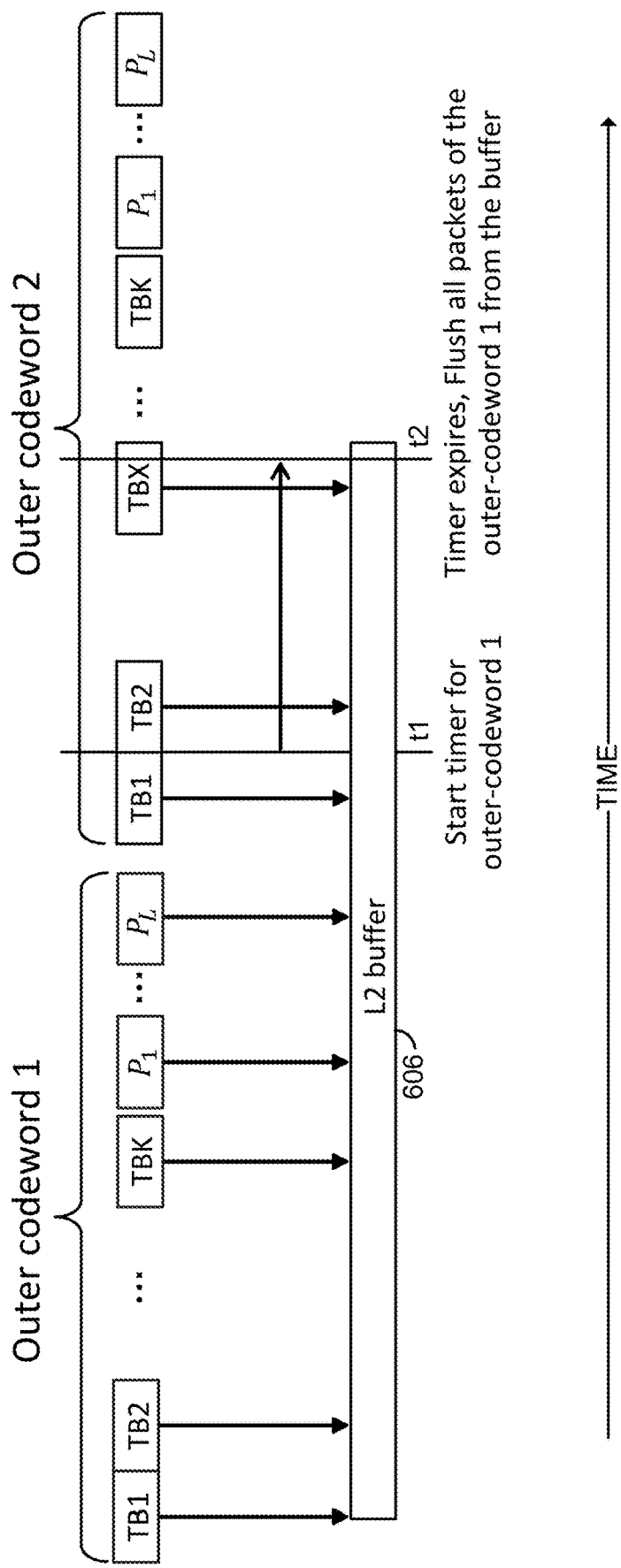
FIG. 6B is a block diagram illustrating a receiver perspective for layer two (L2) buffer processing, in accordance with aspects of the present disclosure.

FIG. 6B is a block diagram illustrating a receiver perspective for layer two (L2) buffer processing. As seen in FIG. 6B, the first outer codeword (outer codeword 1) and the second outer codeword (outer codeword 2) are ready for transmission. Each of the outer codewords includes K information packets (TB 1 to TB K) and L parity packets ($P_1$ to $P_L$). The receiver stores the received packets in the L2 buffer 606. Once the receiver discovers that a packet from a different codeword (e.g., TB 1 from outer codeword 2) is received, the receiver may start a timer (at time t1) for the first outer codeword (outer codeword 1). The timer may account for the physical layer retransmission delay and the decoding delay. The timer may be 5 ms in some configurations. After the timer expires (at time t2), the receiver discards all packets from the first outer codeword (outer codeword 1) regardless of whether they are correctly received. The packets belonging to the new outer codeword (outer codeword 2) remain in the L2 buffer 606 until a timer associated with a third outer codeword (not shown) expires.

In other aspects of the present disclosure, signaling of the outer code indicates to the receiver how a parity code operates and whether a received packet is an information packet or a parity packet. In these aspects, the transmitter may configure the UE with a particular outer code, which may indicate what component packets form a parity packet. In the example discussed previously, the first parity packet includes the first information packet plus the second information packet. The transmitter may also configure the receiver with parameters k and n, where k is the number of information packets, and n is the number of total packets after encoding. All packets may be indexed by an integer m, and the value "m mod n" is used by the receiver to determine the format of the packets (in other words, whether the packet is an information packet or a parity packet). If the packet index modulo n is less than k, then the packet is an information packet. Otherwise, the packet is a parity packet. If the received packet is a parity packet, the information packets that are used to form this parity will be determined. The code may be specified in the standards, such that the parameters k and n will indicate the particular code used. For example, the transmitting device may configure a Reed-Solomon code, a fountain code, an algebraic code, a Raptor code, a Bose-Chaudhuri-Hocquenghem (BCH) code, a minimum distance separable (MDS) code, or a rateless code, with appropriate coding parameters. In a downlink example, the base station configures the UE with this information.

For example, suppose the parameters indicate (25, 31) error correcting codes were used as an outer code, where k is 25 and n is 31. In this example, then let $a_0, \ldots, a_{30}$ denote the coded symbols (one symbol represents one packet), where the first 25 symbols are information symbols, and remaining six symbols are parity symbols. Then a packet with index 10 is the 10th information symbol (corresponding to $a_9$), and a packet with index 28 is a parity packet which corresponds to $a_{27}$. In this example, the tenth packet and the twenty-eighth packet belong to a same outer codeword. Another packet with index 40 belongs to the second outer codeword, and corresponds again to $a_9$, because 40 mod 31=9.

According to further aspects of the present disclosure, a transmitter may decide on its own to skip transmitting some of the packets that belong to a same outer codeword. This may occur when the transmitter determines that the receiver has correctly received all information packets of the outer codeword. For example, this information may be conveyed with acknowledgments from the receiver or in some implementation specific manner. However, the packet index of the skipped packets will not be skipped, even when skipping transmissions. For example, the transmitter may decide to transmit packets 1-30, skip 31, and then transmit packet 32, 33, etc. In this case, packet 32 will not be labeled with index 31. In other words, from the perspective of the receiver, packet 31 will not be received by the receiver. Thus, the receiver will still be able to determine the format of the received packets.

According to further aspects of the present disclosure, when the outer code technique is configured and enabled, RLC acknowledgement may be turned off. In other words, the base station may configure the transmitter and receiver to work in RLC unacknowledged mode (UM) where the RLC layer does not retransmit packets.

According to other aspects of the present disclosure, if carrier aggregation (CA) is supported, outer coded packets are transmitted over different component carriers (CCs) in order to harvest the frequency diversity and coding gain. In some aspects, the outer code technique is enabled when multiple component carriers are configured for the UE.

Figure 7:
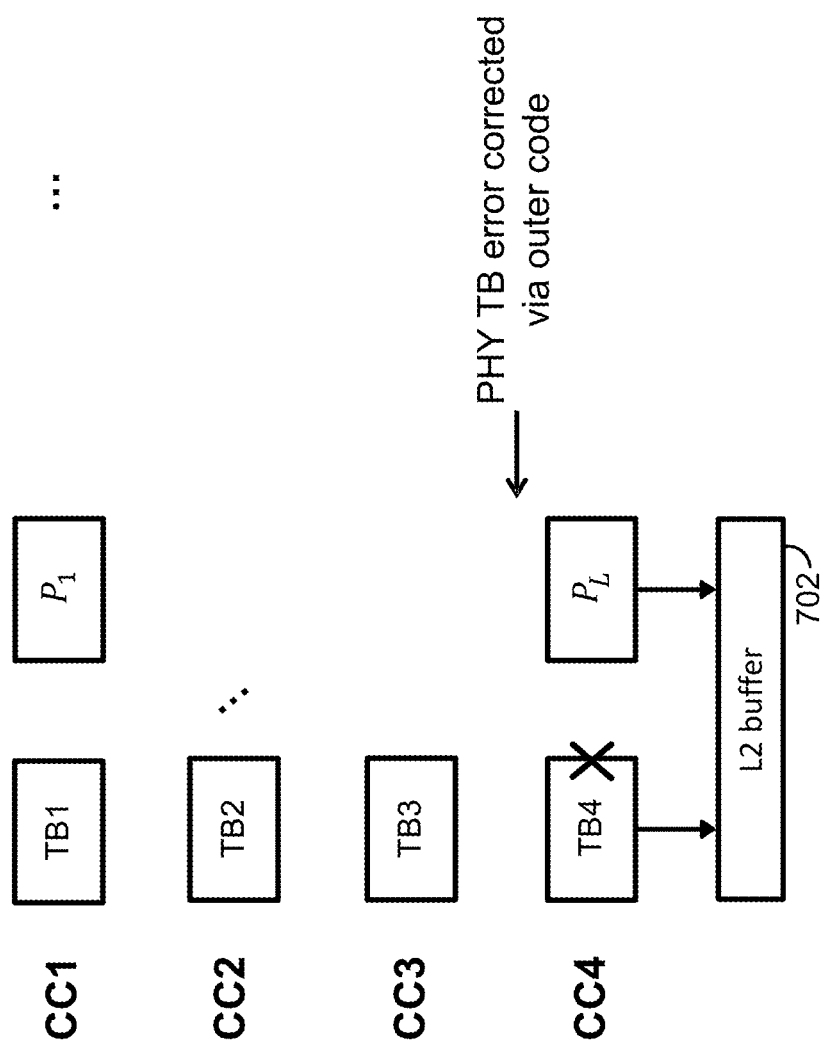
FIG. 7 is a block diagram illustrating application of outer codes for transmissions across four component carriers (CCs), in accordance with aspects of the present disclosure.

FIG. 7 is a block diagram illustrating application of outer codes for transmissions across four component carriers (CCs), in accordance with aspects of the present disclosure.

In the example of FIG. 7, a first transport block (TB 1) is correctly received on a first component carrier (CC1). A second transport block (TB 2) is correctly received on a second component carrier (CC2), and a third transport block (TB 3) is correctly received on a third component carrier (CC3). A fourth transport block (TB 4) is not correctly received on a fourth component carrier (CC4). The received packets TB 1-TB 4 are stored in an L2 buffer 602. Corresponding parity bits $P_1$ to $P_L$ are also received and stored in the L2 buffer 602. Due to the reception of the Lth parity packet $P_L$, the fourth packet (TB 4) may be quickly recovered.

According to aspects of the present disclosure, the transmitter may configure the receiver to switch between a legacy transmission mode (e.g., with HARQ and RLC retransmissions) and the outer code mode. The decision for switching may be based on buffer utilization at the receiver, as well as other requirements, such as throughput, latency, and/or service reliability (e.g., voice/video applications may tolerate a 1% packet loss rate). For example, the outer code technique may be enabled when the buffer utilization at the receiver exceeds a threshold. In other examples, the outer code may be enabled by the transmitter when the overall throughput specified to support the communication services exceeds a threshold. In some aspects of the present disclosure, a capability message may indicate a UE is capable of performing the outer code technique.

In aspects of the present disclosure, the receiver may feedback information to assist the transmitter in deciding which mode to enable. For example, the receiver may indicate buffer utilization information to the transmitter periodically. In other aspects, the receiver may indicate the buffer utilization upon occurrence of a triggering event. An example triggering event may occur when a receiver buffer utilization exceeds a threshold. Another example triggering event may occur upon receiving a buffer status request from the transmitter. Yet another triggering event may occur when an instantaneous perceived throughput exceeds a threshold.

According to aspects of the present disclosure, the receiver may enable layer one (L1) automatic repeat request (ARQ) processing (or hybrid ARQ (HARQ) processing) in addition to the outer code technique. The ARQ/HARQ processing may improve the reliability target at the physical layer, for example, when the error rate is higher due to the physical layer being unreliable. In this case, the physical layer may assist with packet recovery. The outer codes may be set based on an error rate at the lower layer. For example, if a ten percent error rate is detected, the outer codes may be constructed to correct one error out of ten packets.

By employing the techniques of the present disclosure, a significant amount of memory savings may be achieved. For example, with a single component carrier (CC), a baseline system with HARQ and RLC retransmission specifies 18.75 MB for layer one (L1) and layer two (L2) memory, with 2.5 Gbps throughput over 100 MHz. If outer coding plus L1 HARQ retransmissions are enabled, a similar amount of memory is specified with 2% throughput loss. If only outer coding is enabled, the memory can be reduced to approximately 13 MB with a 9% throughput loss.

For two CCs at 5 Gbps over 200 MHz, a baseline system specifies 37.5 MB for L1 and L2 memory. If outer coding plus L1 HARQ retransmissions are enabled, approximately 28 MB of memory is specified with 2% throughput loss. If only outer coding occurs, the memory can be reduced to approximately 20 MB with a 9% throughput loss.

For eight CCs at 20 Gbps over 800 MHz, a baseline system specifies 150 MB for L1 and L2 memory, including 50 MB for the L1 buffer and 100 MB for the L2 buffer. If outer coding plus L1 HARQ retransmissions is enabled, approximately 75 MB of memory is specified with 2% throughput loss. In this configuration, the L1 buffer is 50 MB, with 12.5 MB specified for one outer code and 12.5 MB specified for L1 round trip time (RTT). If a 5% throughput loss is acceptable, 67.5 MB of memory is specified with an L1 buffer of 50 MB, 5 MB for one outer code, and 12.5 MB for L1 RTT. If only outer coding occurs, the memory can be reduced to approximately 25 MB with an 8.5% throughput loss (e.g., a reduction by a factor of six). In this configuration, approximately 24 MB is specified for one outer code and 1.25 MB is specified for one extra slot. If 5% throughput is desired, the memory can be reduced to approximately 80 MB, with 79 MB assigned to one outer code and 1.25 MB specified for one extra slot.

Thus, it can be seen that memory savings for outer coding is more significant when the number of CCs is larger, allowing coding across CCs. The outer code only technique reduces memory the most, at the cost of a larger throughput loss. By combining outer codes with L1 HARQ processing, significant memory reduction is achieved with little throughput loss (e.g., <2%).

In legacy wireless communication systems (e.g., 5G NR), a UE is specified to implement an L2 buffer with a size based on throughput. For example 3GPP technical specification (TS) 38.306 defines the memory size to be at least MaxDLDataRate*RLC RTT+MaxULDataRate*RLC RTT, where RLC RTT is an RLC round trip time and is function of subcarrier spacing (SCS), and MaxDLDataRate and MaxULDataRate are the specified downlink and uplink data rates, respectively.

Aspects of the present disclosure define the buffer size for UEs supporting transmission with outer codes. In a first option, the L2 buffer size is defined the same way as with the legacy system. In this option, however, the UE may additionally report a maximum supported data rate when outer codes are enabled. In other words, the UE reports two maximum data rates: a maximum rate achievable with outer codes, and a maximum rate achievable without outer codes. The maximum data rate achievable with outer codes is for the same L2 buffer size used without outer codes.

In a second option, the L2 buffer size may be defined as a (maximum data rate)*max_outer_code_length_time+extra, where extra=maximum data rate*L1 RTT. The max_outer_code_length_time and/or the L1 RTT may be defined in the standard, as a function of sub carrier spacing. This equation relies upon an absolute data rate. In other aspects of the second option, the L2 buffer size may be defined as a (maximum per CC data rate)*max_outer_code_length_time+extra. This equation calculates based on a number of CCs because the outer codes will be transmitted across different CCs. The max_outer_code_length_time can be a number defined in the standard, similar to round trip time (RTT), as a function of the subcarrier spacing. The maximum outer code length time may be a maximum time required to transmit one codeword of an outer code.

In the second option, the UE may separately support outer codes for uplink and downlink communications. In this case, the total L2 buffer may be computed as the sum of uplink and downlink L2 buffer sizes, which may be calculated via either the legacy method or the new method. For example, if the legacy technique is supported for uplink communications and the outer code technique is supported for downlink communications, the buffer size is calculated as a sum of the legacy formula for uplink (e.g., MaxULDataRate*RLC RTT) and the new formula for downlink ((maximum data rate or maximum per CC data rate)*max_outer_code_length_time+extra).

If a UE supports legacy transmission for a first throughput and transmission with outer codes for a different throughput, the UE should have a buffer size large enough to cover the maximum size specified for the different throughput/transmission mode combinations. For example, if the first throughput level for the legacy transmission mode specifies a 100 MB buffer and the second throughput level for the outer code transmission mode specifies a 90 MB buffer, the UE should accommodate the maximum of the two sizes, which is 100 MB in this example.

As indicated above, FIGS. 4-7 are provided as examples. Other examples may differ from what is described with respect to FIGS. 4-7.

Figure 8:
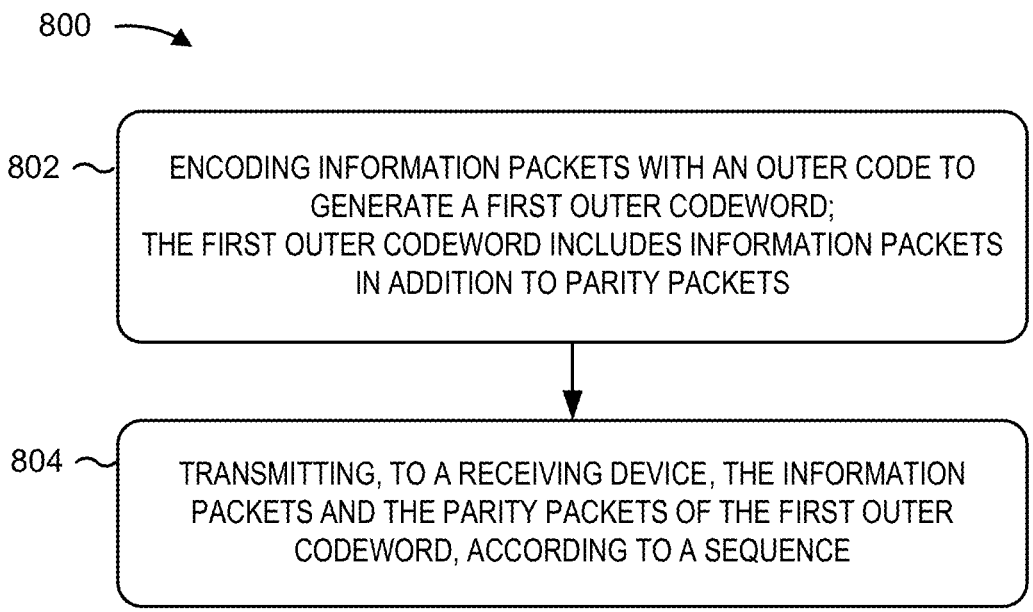
FIG. 8 is a flow diagram illustrating an example process performed, for example, by a transmitting device, in accordance with various aspects of the present disclosure.

FIG. 8 is a flow diagram illustrating an example process 800 performed, for example, by a transmitting device, in accordance with various aspects of the present disclosure. The example process 800 is an example of outer coding for upper layer data units. The transmitting device may be a network entity such as a distributed unit (DU) of a base station, an entire base station, another component or components of a base station, or a UE.

In some aspects, the process 800 may include encoding information packets with an outer code to generate a first outer codeword. The first outer codeword includes information packets in addition to parity packets (block 802). For example, the UE or a network entity, such as a base station (for example, using the controller/processor 280, 240, and/or memory 282, 242) may generate the first outer codeword. The outer code may be a Reed-Solomon code, a fountain code, an algebraic code, a Raptor code, a Bose-Chaudhuri-Hocquenghem (BCH) code, a minimum distance separable (MDS) code, or a rateless code. The outer code may be selected based on an error rate of communications with the receiving device. The encoding may occur when the receiving device is configured with multiple component carriers.

The process 800 may include transmitting, to a receiving device, the information packets and the parity packets of the first outer codeword, according to a sequence (block 804). For example, the UE or base station (for example, using the antenna 252a, 234a, DEMOD/MOD 254a, 232a, TX MIMO processor 266, 230, transmit processor 264, 220, controller/processor 280, 240, and/or memory 282, 242) may transmit the information packets and parity packets. The transmitting of the information packets and parity packets of the first outer codeword may occur prior to transmitting any packets belonging to a next outer codeword. The transmitting may occur via different component carriers. In some aspects, the transmitting device indicates codeword indexes of the first outer codeword and the next outer codeword. In implementations where the transmitting device is a network entity and the receiving device is a user equipment (UE), the network entity configures the UE with at least one of: a number of information packets in the first outer codeword, and a total number of packets in the first outer codeword, or a coding configuration associated with the outer code. In these implementations, the network device may configure the UE to disable radio link control (RLC) acknowledgment. The network device may also configure the UE to switch to a legacy mode and stop encoding the information packets with the outer code. The configuring may occur in response to a buffer utilization at the UE falling below a threshold value. The buffer utilization may be indicated by the UE. The network device may request the buffer utilization from the UE. The configuring may occur in response to an overall throughput falling below a threshold value. The overall throughput may be indicated by the UE. In some aspects, the receiving device may determine the receiving device has correctly received the information packets; and skip transmitting of at least one of the parity packets in response to determining the receiving device has correctly received the information packets. Skipping transmitting may occur without skipping a packet index. In some aspects, the transmitting device performs layer one (L1) automatic repeat request (ARQ) processing for the information packets.

Figure 9:
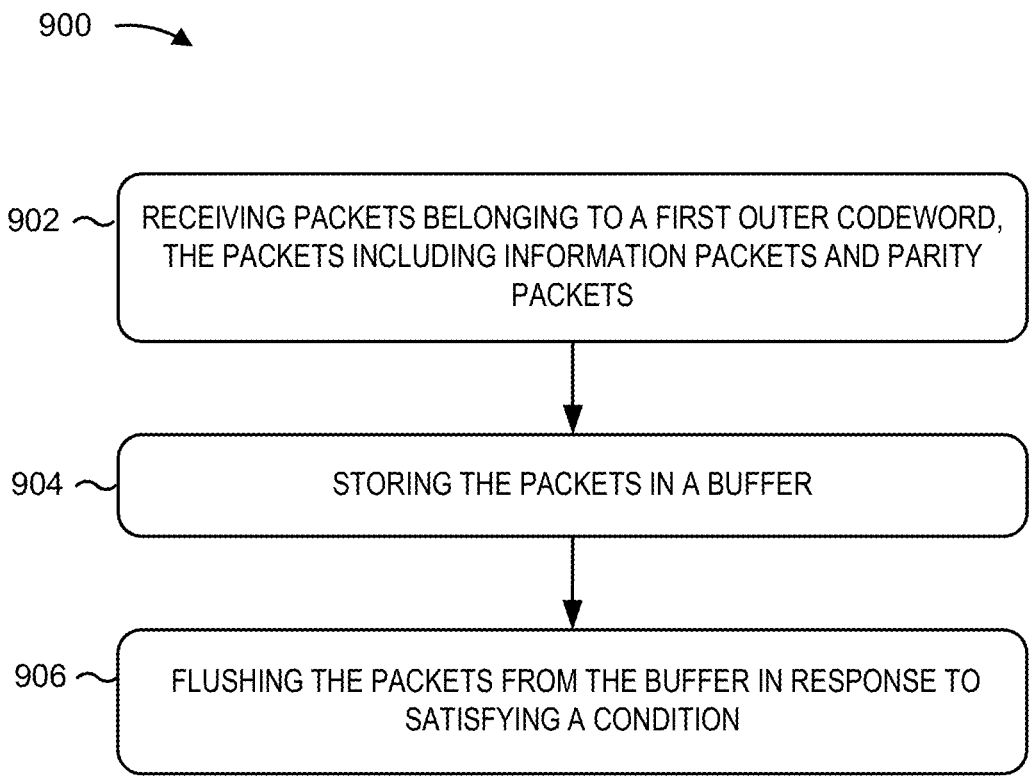
FIG. 9 is a flow diagram illustrating an example process performed, for example, by a receiving device, in accordance with various aspects of the present disclosure.

FIG. 9 is a flow diagram illustrating an example process 900 performed, for example, by a receiving device, in accordance with various aspects of the present disclosure. The example process 900 is an example of outer coding for upper layer data units. The receiving device may be a network entity such as a distributed unit (DU) of a base station, an entire base station, another component or components of a base station, or a UE.

The process 900 may include receiving packets belonging to a first outer codeword, the packets including information packets and parity packets (block 902). For example, the UE or a network entity, such as a base station (for example, using the antenna 252a, 234a, DEMOD/MOD 254a, 232a, MIMO detector 256, 236, receive processor 258, 264, controller/processor 280, 240, and/or memory 282, 242) may receive the packets including information packets and parity packets. The receiver may also receive codeword indexes of the first outer codeword and the next outer codeword, which may have a higher index than the first outer codeword. An outer code may comprise: a Reed-Solomon code, a fountain code, an algebraic code, a Raptor code, a Bose-Chaudhuri-Hocquenghem (BCH) code, a minimum distance separable (MDS) code, and/or a rateless code. The receiving device may also report a first maximum data rate achievable with an outer code, and a second maximum data rate achievable without the outer code. The first maximum data rate and second maximum data rate are both achieved with a same layer two (L2) buffer size.

The process 900 may include storing the packets in a buffer (block 904). For example, the UE or base station (for example, using the controller/processor 280, 240, and/or memory 282, 242) may store the packets. A size of the buffer may be determined based on a length of an outer code, a peak throughput that the receiving device can support, a transmit time interval (TTI) length, a maximum transport block size per component carrier, and/or a maximum number of component carriers supported by the receiving device. A size of the buffer may be determined based on: a maximum data rate, a maximum outer code length time, a maximum per component carrier data rate, and/or a layer one (L1) round trip time (RTT). The size of the buffer may be determined based on separate support of uplink transmission with outer codes or downlink transmission with outer codes.

The process 900 may include flushing the packets from the buffer in response to satisfying a condition (block 906). For example, the UE or base station (for example, using the controller/processor 280, 240, and/or memory 282, 242) may flush the packets. The condition may be satisfied when the receiving device correctly receives all of the information packets in the first outer codeword. In other aspects, the condition may be satisfied when the receiving device receives an information packet from a next outer codeword. In still other aspects, the condition is satisfied when the receiving device receives a packet from a next outer codeword and a timer expires. In this case, flushing the buffer includes flushing the packets belonging to the first outer codeword after expiration of the timer. The timer may be started when receiving the packet from the next outer codeword. A configuration may be received, from a network entity, for a duration of the timer. In some aspects, the receiving device may receive an outer code configuration including a number information packets in the first outer codeword, a total number of packets in the first outer codeword, and/or a coding configuration associated with an outer code. The receiving device may also determine a format of each of the packets based on a packet index and the total number of packets; and determine which of the information packets cooperate to form a parity packet based on the coding configuration. The receiving device may also perform layer one (L1) automatic repeat request (ARQ) processing for the packets. In some implementations, the receiving device is a user equipment and the method further comprises indicating a buffer utilization information to a network entity. The indicating may occur periodically. The indicating may occur in response to a buffer utilization exceeding a threshold value. The indicating may occur in response to receiving a buffer status request from the network entity. The indicating may occur in response to an instantaneous perceived throughput exceeding a threshold value. The receiving device may also indicate to a network entity a capability to support outer coding.

Implementation examples are described in the following numbered clauses:

1. A method of wireless communication, by a transmitting device, comprising:
   encoding a plurality of information packets with an outer code to generate a first outer codeword, the first outer codeword including the plurality of information packets in addition to a plurality of parity packets; and
   transmitting, to a receiving device, the plurality of information packets and the plurality of parity packets of the first outer codeword, according to a sequence.
2. The method of clause 1, in which the transmitting the plurality of information packets and the plurality of parity packets of the first outer codeword occurs prior to transmitting any packets belonging to a next outer codeword.
3. The method of clause 1 or 2, further comprising indicating codeword indexes of the first outer codeword and the next outer codeword.
4. The method of any of the preceding clauses, in which the transmitting device is a network entity and the receiving device is a user equipment (UE), and the method further comprises configuring the UE with at least one of: a number of information packets in the first outer codeword, and a total number of packets in the first outer codeword, or a coding configuration associated with the outer code.
5. The method of any of the preceding clauses, in which the outer code comprises one of:
   a Reed-Solomon code,
   a fountain code,
   an algebraic code,
   a Raptor code,
   a Bose-Chaudhuri-Hocquenghem (BCH) code,
   a minimum distance separable (MDS) code, or
   a rateless code.
6. The method of any of the preceding clauses, further comprising:
   determining the receiving device has correctly received the plurality of information packets; and
   skipping transmitting of at least one of the plurality of parity packets in response to determining the receiving device has correctly received the plurality of information packets, the skipping transmitting occurring without skipping a packet index.
7. The method of any of the preceding clauses, in which the transmitting device is a network entity and the receiving device is a user equipment (UE), and the method further comprises configuring the UE to disable radio link control (RLC) acknowledgment.
8. The method of any of the preceding clauses, in which the transmitting occurs via different component carriers.
9. The method of any of the preceding clauses, in which the encoding occurs when the receiving device is configured with a plurality of component carriers.
10. The method of any of the preceding clauses, in which the transmitting device is a network entity and the receiving device is a user equipment (UE), and the method further comprises configuring the UE to switch to a legacy mode and stop encoding the plurality of information packets with the outer code.
11. The method of any of the preceding clauses, in which the configuring occurs in response to a buffer utilization at the UE falling below a threshold value.
12. The method of any of the preceding clauses, further comprising receiving the buffer utilization from the UE.
13. The method of any of the preceding clauses, further comprising requesting the buffer utilization from the UE.
14. The method of any of the preceding clauses, in which the configuring occurs in response to an overall throughput falling below a threshold value.
15. The method of any of the preceding clauses, further comprising receiving the overall throughput from the UE.
16. The method of any of the preceding clauses, further comprising selecting the outer code based on an error rate of communications with the receiving device.
17. The method of any of the preceding clauses, further comprising performing layer one automatic repeat request (ARQ) processing for the plurality of packets.
18. A method of wireless communication by a receiving device, comprising:
    receiving a plurality of packets belonging to a first outer codeword, the plurality of packets including information packets and parity packets;
    storing the plurality of packets in a buffer; and
    flushing the plurality of packets from the buffer in response to satisfying a condition.
19. The method of clause 18, in which the condition is satisfied when the receiving device correctly receives all of the information packets in the first outer codeword.
20. The method of clause 18 or 19, in which the condition is satisfied when the receiving device receives an information packet from a next outer codeword.
21. The method of clause 18, 19, or 20, further comprising receiving codeword indexes of the first outer codeword and the next outer codeword.
22. The method of any of clauses 18-21, in which the next outer codeword has a higher index than the first outer codeword.
23. The method of any of clauses 18-22, in which the condition is satisfied when the receiving device receives a packet from a next outer codeword and a timer expires; and flushing the buffer comprises flushing the plurality of packets belonging to the first outer codeword from the buffer after expiration of the timer.
24. The method of any of clauses 18-23, further comprising starting the timer when receiving the packet from the next outer codeword.
25. The method of any of clauses 18-24, further comprising receiving a configuration for a duration of the timer from a network entity.
26. The method of any of clauses 18-25, further comprising:
  receiving an outer code configuration including at least one of: a number information packets in the first outer codeword, a total number of packets in the first outer codeword, or a coding configuration associated with an outer code;
  determining a format of each of the plurality of packets based on a packet index and the total number of packets; and
  determining which of the information packets cooperate to form a parity packet based on the coding configuration.
27. The method of any of clauses 18-26, further comprising performing layer one automatic repeat request (ARQ) processing for the plurality of packets.
28. The method of any of clauses 18-27, in which the receiving device is a user equipment and the method further comprises indicating a buffer utilization information to a network entity.
29. The method of any of clauses 18-28, in which the indicating occurs periodically.
30. The method of any of clauses 18-28, in which the indicating occurs in response to a buffer utilization exceeding a threshold value.
31. The method of any of clauses 18-28, in which the indicating occurs in response to receiving a buffer status request from the network entity.
32. The method of any of clauses 18-28, in which the indicating occurs in response to an instantaneous perceived throughput exceeding a threshold value.
33. The method of any of clauses 18-32, further comprising indicating to a network entity a capability to support outer coding.
34. The method of any of clauses 18-33 in which an outer code comprises one of:
  a Reed-Solomon code,
  a fountain code,
  an algebraic code,
  a Raptor code,
  a Bose-Chaudhuri-Hocquenghem (BCH) code,
  a minimum distance separable (MDS) code, or
  a rateless code.
35. The method of any of clauses 18-34, in which a size of the buffer is determined based on at least one of a length of:
  an outer code,
  a peak throughput that the receiving device can support,
  a transmit time interval (TTI) length,
  a maximum transport block size per component carrier, or
  a maximum number of component carriers supported by the receiving device.
36. The method of any of the clauses 18-35, in which a size of the buffer is determined based on at least one of: a maximum data rate, a maximum outer code length time, a maximum per component carrier data rate, or a layer one (L1) round trip time (RTT).
37. The method of clause 36, in which the size of the buffer is determined based on separate support of uplink transmission with outer codes or downlink transmission with outer codes.
38. The method of any of the clauses 18-37, further comprising reporting a first maximum data rate achievable with an outer code, and a second maximum data rate achievable without the outer code, the first maximum data rate and second maximum data rate both achieved with a same layer two (L2) buffer size.
39. An apparatus for wireless communication, by a transmitting device, comprising a memory, and at least one processor coupled to the memory, the at least one processor configured to encode a plurality of information packets with an outer code to generate a first outer codeword, the first outer codeword including the plurality of information packets in addition to a plurality of parity packets; and to transmit, to a receiving device, the plurality of information packets and the plurality of parity packets of the first outer codeword, according to a sequence.
40. The apparatus of clause 39, in which the at least one processor is configured to transmit the plurality of information packets and the plurality of parity packets of the first outer codeword occurs prior to transmitting any packets belonging to a next outer codeword.
41. The apparatus of clause 39 or 40, in which the transmitting device is a network entity and the receiving device is a user equipment (UE), and the at least one processor is further configured to configure the UE with at least one of: a number of information packets in the first outer codeword, and a total number of packets in the first outer codeword, or a coding configuration associated with the outer code.
42. The apparatus of any of clauses 39-41, in which the outer code comprises one of: a Reed-Solomon code, a fountain code, an algebraic code, a Raptor code, a Bose-Chaudhuri-Hocquenghem (BCH) code, a minimum distance separable (MDS) code, or a rateless code.
43. The apparatus of any of clauses 39-42, in which the at least one processor is further configured to determine the receiving device has correctly received the plurality of information packets; and to skip transmitting of at least one of the plurality of parity packets in response to determining the receiving device has correctly received the plurality of information packets, the skipping transmitting occurring without skipping a packet index.
44. The apparatus of any of clauses 39-43, in which the transmitting device is a network entity and the receiving device is a user equipment (UE), and the at least one processor is further configured to configure the UE to disable radio link control (RLC) acknowledgment.
45. The apparatus of any of clauses 39-44, in which the at least one processor is configured to transmit via different component carriers.
46. The apparatus of any of clauses 39-45, in which the transmitting device is a network entity and the receiving device is a user equipment (UE), and the at least one processor is further configured to configure the UE to switch to a legacy mode and stop encoding the plurality of information packets with the outer code.

47. The apparatus of any of clauses 39-46, in which the at least one processor is configured to configure in response to a buffer utilization at the UE falling below a threshold value.

48. The apparatus of any of clauses 39-47, in which the at least one processor is further configured to receive the buffer utilization from the UE.

49. The apparatus of any of clauses 39-48, in which the at least one processor is configured to configure in response to an overall throughput falling below a threshold value.

50. The apparatus of any of clauses 39-49, in which the at least one processor is further configured to select the outer code based on an error rate of communications with the receiving device.

51. The apparatus of any of clauses 39-50, in which the at least one processor is further configured to perform layer one automatic repeat request (ARQ) processing for the plurality of information packets.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a transmitting device, comprising:
    encoding a plurality of information packets with an outer code to generate a first outer codeword, the first outer codeword including the plurality of information packets in addition to a plurality of parity packets;
    transmitting, to a receiving device, the plurality of information packets and the plurality of parity packets of the first outer codeword, according to a sequence; and
    configuring the receiving device to switch to a legacy transmission mode and stop encoding the plurality of information packets with the outer code.

2. The method of claim 1, in which the transmitting the plurality of information packets and the plurality of parity packets of the first outer codeword occurs prior to transmitting any packets belonging to a next outer codeword.

3. The method of claim 2, further comprising indicating codeword indexes of the first outer codeword and the next outer codeword.

4. The method of claim 1, in which the transmitting device is a network entity and the receiving device is a user equipment (UE), and the method further comprises configuring the UE with at least one of: a number of information packets in the first outer codeword, and a total number of packets in the first outer codeword, or a coding configuration associated with the outer code.

5. The method of claim 1, in which the outer code comprises one of:
    a Reed-Solomon code,
    a fountain code,
    an algebraic code,
    a Raptor code,
    a Bose-Chaudhuri-Hocquenghem (BCH) code,
    a minimum distance separable (MDS) code, or
    a rateless code.

6. The method of claim 1, further comprising:
    determining the receiving device has correctly received the plurality of information packets; and
    skipping transmitting of at least one of the plurality of parity packets in response to determining the receiving device has correctly received the plurality of information packets, the skipping transmitting occurring without skipping a packet index.

7. The method of claim 1, in which the transmitting device is a network entity and the receiving device is a user equipment (UE), and the method further comprises configuring the UE to disable radio link control (RLC) acknowledgment.

8. The method of claim 1, in which the transmitting occurs via different component carriers.

9. The method of claim 8, in which the encoding occurs when the receiving device is configured with a plurality of component carriers.

10. The method of claim 1, in which the configuring occurs in response to a buffer utilization a user equipment (UE) falling below a threshold value.

11. The method of claim 10, further comprising receiving the buffer utilization from the UE.

12. The method of claim 11, further comprising requesting the buffer utilization from the UE.

13. The method of claim 1, in which the configuring occurs in response to an overall throughput falling below a threshold value.

14. The method of claim 13, further comprising receiving the overall throughput from the UE.

15. The method of claim 1, further comprising selecting the outer code based on an error rate of communications with the receiving device.

16. The method of claim 1, further comprising performing layer one automatic repeat request (ARQ) processing for the plurality of information packets.

17. An apparatus for wireless communication, by a transmitting device, comprising:
a memory; and
at least one processor coupled to the memory, the at least one processor configured:
to encode a plurality of information packets with an outer code to generate a first outer codeword, the first outer codeword including the plurality of information packets in addition to a plurality of parity packets;
to transmit, to a receiving device, the plurality of information packets and the plurality of parity packets of the first outer codeword, according to a sequence; and
to configure the receiving device to switch to a legacy transmission mode and stop encoding the plurality of information packets with the outer code.

18. The apparatus of claim 17, in which the at least one processor is configured to transmit the plurality of information packets and the plurality of parity packets of the first outer codeword occurs prior to transmitting any packets belonging to a next outer codeword.

19. The apparatus of claim 17, in which the transmitting device is a network entity and the receiving device is a user equipment (UE), and the at least one processor is further configured to configure the UE with at least one of: a number of information packets in the first outer codeword, and a total number of packets in the first outer codeword, or a coding configuration associated with the outer code.

20. The apparatus of claim 17, in which the outer code comprises one of:
a Reed-Solomon code,
a fountain code,
an algebraic code,
a Raptor code,
a Bose-Chaudhuri-Hocquenghem (BCH) code,
a minimum distance separable (MDS) code, or
a rateless code.

21. The apparatus of claim 17, in which the at least one processor is further configured:
to determine the receiving device has correctly received the plurality of information packets; and
to skip transmitting of at least one of the plurality of parity packets in response to determining the receiving device has correctly received the plurality of information packets, the skipping transmitting occurring without skipping a packet index.

22. The apparatus of claim 17, in which the transmitting device is a network entity and the receiving device is a user equipment (UE), and the at least one processor is further configured to configure the UE to disable radio link control (RLC) acknowledgment.

23. The apparatus of claim 17, in which the at least one processor is configured to transmit via different component carriers.

24. The apparatus of claim 17, in which the at least one processor is configured to configure in response to a buffer utilization at a user equipment (UE) falling below a threshold value.

25. The apparatus of claim 24, in which the at least one processor is further configured to receive the buffer utilization from the UE.

26. The apparatus of claim 17, in which the at least one processor is configured to configure in response to an overall throughput falling below a threshold value.

27. The apparatus of claim 17, in which the at least one processor is further configured to select the outer code based on an error rate of communications with the receiving device.

28. The apparatus of claim 17, in which the at least one processor is further configured to perform layer one automatic repeat request (ARQ) processing for the plurality of information packets.

* * * * *